Nov. 19, 1935.  F. P. LOVEJOY  2,021,188
METAL WORKING TOOL
Filed Jan. 19, 1934
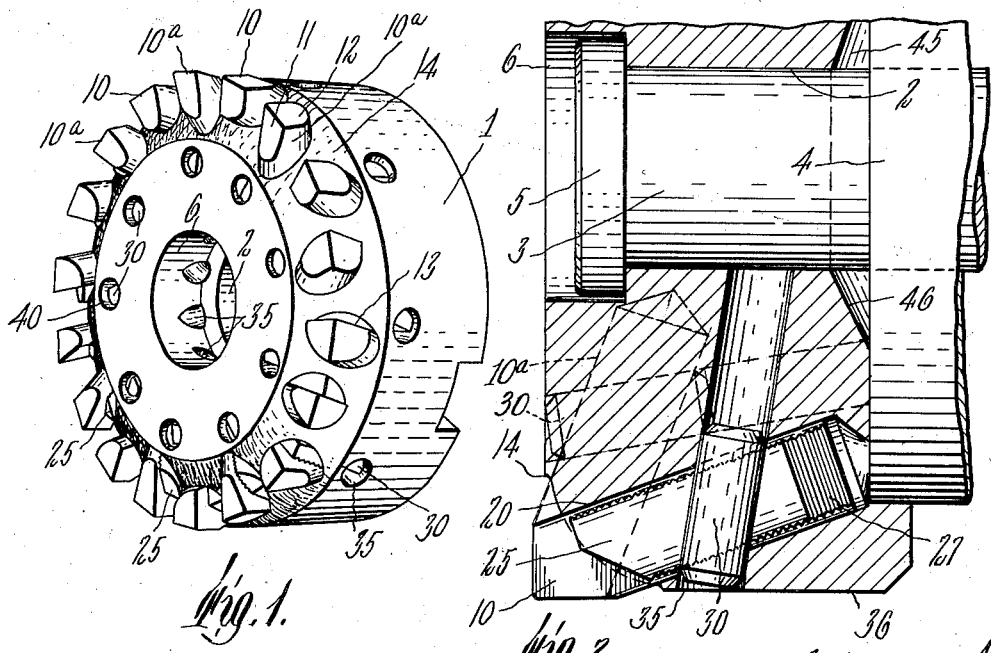
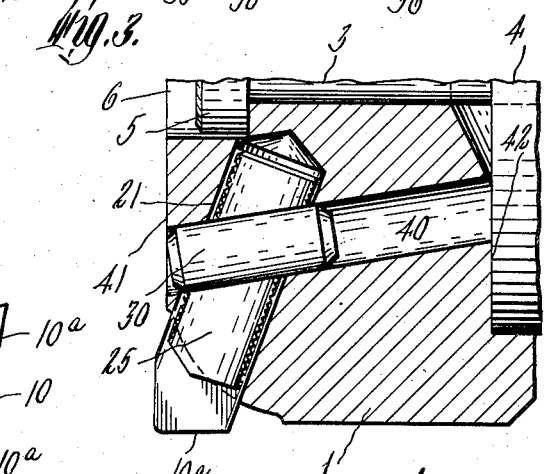
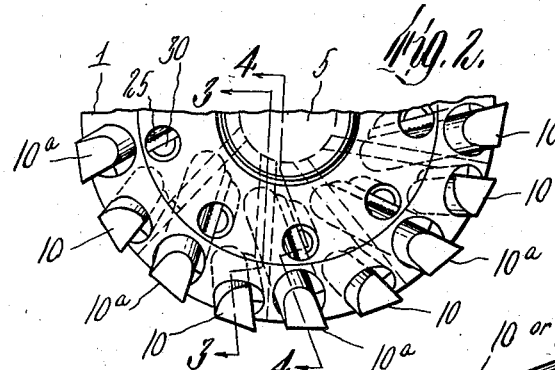
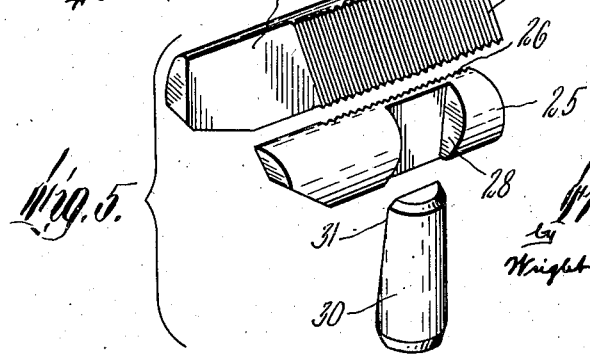
Inventor
Fred P. Lovejoy
by Wright Brown Quinby May
attys.

Patented Nov. 19, 1935

2,021,188

UNITED STATES PATENT OFFICE 2,021,188

METAL WORKING TOOL

Fred P. Lovejoy, Springfield, Vt.

Application January 19, 1934, Serial No. 707,288

8 Claims. (Cl. 29—105)

This invention relates to metal working tools of that type wherein a plurality of detachable cutters are associated with a single body, as is disclosed in my Patent No. 1,242,707 for Metal working tool, granted October 9, 1917, and has for an object to provide a construction whereby a closer spacing of the cutters, and consequently a greater number may be had, than with prior constructions. The number of cutters in each body and their spacing is limited by the cutter-securing mechanism, and there are often requirements, as when thin edges are to be finished, that a closer spacing between the cutter than has heretofore been possible is very desirable or even necessary.

In accordance with this invention this closer spacing of the cutters is produced by arranging adjacent cutters at different angles relative to the tool axis in such a way that the securing means for each cutter is well out of the way of an adjacent cutter or securing means for an adjacent cutter, even when the cutters themselves are closely spaced.

For a more complete understanding of this invention, reference may be had to the accompanying drawing in which Figure 1 is a perspective of a tool constructed according to this invention.

Figure 2 is a fragmentary front elevation of the same.

Figures 3 and 4 are detail sections to a larger scale on lines 3—3 and 4—4, respectively, of Figure 2.

Figure 5 is a disassembled perspective of a cutter and its securing means.

Referring to the drawing, at 1 is indicated an annular tool body having a central bore 2 therethrough for the reception of a headed securing post 3 by which the tool body may be secured to the end of a shaft 4, the head 5 of the post 3 resting in a counterbored portion 6 in the outer end of the body 1. Within this body are arranged a plurality of cutters 10 and 10a, each one in the form of a bar having end faces 11 and 12 defining with a forward face 13 angularly related cutting edges of the cutter. In the form of tool illustrated, these cutting edges are on end portions of the cutter bars which project from the inclined end face 14 of the body 1 and the bars are so arranged as to present their cutting edges in a circular series or array and defining angularly disposed circular perimeters. Angularly adjacent cutter bars are of a different series, two series being shown, the cutters of one series being designated as 10 and those of the other series as 10a, the cutter bars of one series being arranged at a different angle to the body axis which is the axis of the circular array of cutter bars than the cutters of the other series. Each of the cutters 10, as shown in Figure 3, is seated in a socket 20, which is formed as a hole extending inwardly from the face 14 and inclined somewhat toward the axis of the body 1. Each of the cutters 10a is seated in a socket 21 formed by drilling into the body 1 at an angle sharply inclined toward the axis of the body 1, as shown in Figure 4. As shown, each cutter bar is secured in the holder by means similar to that shown in my Patent No. 1,242,707 hereinbefore mentioned. This securing or locking means for each cutter comprises a shoe 25, shown detached in Figure 5, having a serrated face 26, which may mate serrations 27 in one face of the cutter bar 10 or 10a, and being provided with a transverse slot 28 for the reception of a cotter 30. Each cotter 30 is formed cylindrical, being cut away at one side along a taper, as at 31, so as to engage between the sides of the slot 28 and wedge the shoe 25 and the tool bar tightly in the tool bar socket. Instead, however, of forming the slot 28 at right angles to the length of the shoe 25, as shown in my former patent, it is formed at a different angle thereto, but preferably the same for all tool bars, as is shown best in Figures 3 and 4. The cotter for locking each of the tools 10 is positioned in a socket 35 formed as a hole drilled through the body 1 from its side face or outer periphery 36 to its central periphery at the bore 2. The cotters which hold the tools 10a in position are inserted in similar drilled sockets 40 which extend through the front and back faces 41 and 42, respectively, of the body. Those sockets which extend through the side face of the body do not extend through either end face and those sockets which extend through the front and back faces are closed at the side face. In Figure 3 the portions of a cutter bar 10a and its locking cotter, as shown in Figure 4, have been indicated in dotted lines. From this it appears that each cutter bar 10 is arranged at a more acute angle to the axis of the series than each cutter bar 10a. Likewise it appears that the cotters 30 for the bars 10 are arranged at less acute angles to that axis than are the cotters for the bars 10a. Also the cotters for the bars 10a are arranged in a circular series of smaller diameter than the cutters 10 with adjacent ones of which they are nearly parallel, and the cotters for the bars 10 are spaced lengthwise of that axis from the tool bars 10a with adjacent ones of which they are nearly parallel. The shoes 25 and cotters 30 may be formed interchangeably so that they may be used with any of the tools 10 or 10a and they may have their serrations in different relative positions, as is described in my prior patent hereinbefore mentioned, in order to provide for a fine adjustment of the cutter bars lengthwise of their sockets.

By arranging the sockets for the cutter bars and the cotters in the relationship shown, adjacent sockets for adjacent tool bars or cotters do not intersect each other, even though the bars are placed relatively close together. The cotters which hold each of the bars 10a may be removed by means of a rod inserted from the back face of the body and driven forward, while the cotters which secure each of the tools 10 in position may be removed by inserting a bar from the inner opening 2 and driving these cotters outwardly. In order to facilitate the insertion of such a tool into the inner ends of these sockets 35, the back face of the body may be cut away as at 45 to a sufficient extent, forming a conical face 46 adjacent to the axis of the body.

It should be evident to those skilled in the art, that the tool body may be made in many different shapes to suit the requirements of various machines and operations and that various other changes and modifications might be made without departing from the spirit or scope of this invention as defined by the appended claims.

I claim:

1. A tool comprising an annular body having a pair of series of holes extending back from the outer portion of one end of said body in circular array, the holes of one series alternating with the holes of the other series, and the holes of one series being inclined to the axis of said array at a steeper angle than those of the other series, tool bars each positioned in one of said holes and with cutting edges at their outer ends, said body having holes for tool bar locking cotters, each cotter hole intersecting one of taid bar holes and all at the same angle to their respective bar holes, a locking shoe engaging the tool bar in each of said bar holes, and a cotter cooperating with said shoe in each of said cotter holes for holding said tool bars in said body, said cotter holes being arranged in non-intersecting relation to tool holes of the other series of tools.

2. A tool comprising an annular body having a pair of series of holes extending back from the outer portion of one end of said body in circular array, the holes of one series alternating with the holes of the other series, and the holes of one series being inclined to the axis of said array at a steeper angle than those of the other series, tool bars each positioned in one of said holes and with cutting edges at their outer ends, said body having holes for tool bar locking cotters, each cotter hole intersecting one of said bar holes and all at the same angle to their respective bar holes, a locking shoe engaging the tool bar in each of said bar holes, and a cotter cooperating with said shoe in each of said cotter holes for holding said tool bars in said body, the cotter holes for one series of bar holes opening outwardly at the opposite ends of said body, and the cotter holes for the other series of bar holes opening out at the inner and outer peripheries of said body.

3. A tool comprising an annular body having a pair of series of holes extending back from the outer portion of one end of said body in circular array, the holes of one series alternating with the holes of the other series, and the holes of one series being inclined to the axis of said array at a steeper angle than those of the other series, tool bars each positioned in one of said holes and with cutting edges at the outer ends, said body having holes for tool bar locking cotters, each cotter hole intersecting one of said bar holes and all at the same angle to their respective bar holes, a locking shoe engaging the tool bar in each of said bar holes, and a cotter cooperating with said shoe in each of said cotter holes for holding said tool bars in said body, the cotter holes for one series of bar holes opening outwardly at the opposite ends of said body, and the cotter holes for the other series of bar holes opening out at the inner and outer peripheries of said body, the back face of said body being cut away to permit the ready insertion of a cotter-removing tool into the inner ends of said last mentioned cotter holes.

4. A tool comprising a body, a pair of series of bar cutters carried by said body, the cutters of each series being arranged in circular array about an axis of said body, the cutters of the two series alternating, the cutters of one series being arranged at a different angle to said axis than the cutters of the other series, and a cutter retainer for each cutter, the retainers for the cutters of one series being arranged in circular series about said axis of smaller diameter than that of the other series of cutters, and the retainers for the cutters of said other series lying in circular series spaced along said axis from the first series of cutters, said cutters and retainers lying in openings in said body, the openings for one series of retainers non-intersecting the openings for the other series of cutters.

5. A tool comprising a body, a pair of series of bar cutters carried by said body, the cutters of each series being arranged in circular array about an axis of said body, the cutters of the two series alternating, the cutters of one series being arranged at a different angle to said axis than the cutters of the other series, and a cutter retainer for each cutter, the retainers for the cutters of one series being arranged in circular series about said axis of smaller diameter than that of the other series of cutters, and the retainers for the cutters of said other series lying in circular series spaced along said axis from the first series of cutters, each retainer being arranged at the same angle to its respective bar, said cutters and retainers lying in openings in said body, the openings for one series of retainers non-intersecting the openings for the other series of cutters.

6. A tool comprising a body, a pair of series of bar cutters carried by said body, the cutters of each series being arranged in circular array about an axis of said body, the cutters of the two series alternating and with cutting edges of all defining a circular perimeter, the cutters of one series being arranged at a different angle to said axis than the cutters of the other series, and a cutter retainer for each cutter, the retainers for the cutters of one series being arranged in circular series about said axis of smaller diameter than that of the other series of cutters, and the retainers for the cutters of said other series lying in circular series spaced along said axis from the first series of cutters, said cutters and retainers lying in openings in said body, the openings for one series of retainers non-intersecting the openings for the other series of cutters.

7. A tool comprising a body, a pair of series of bar cutters carried by said body, the cutters of each series being arranged in circular array about an axis, the cutters of one series being arranged at more acute angles to said axis than the cutters of the other series, the cutters of one series alternating the cutters of the other series, and a cotter arranged at an angle to each cutter for securing its respective cutter in position, the cotters for the cutters arranged at the more acute angles to said axis being arranged at less acute angles to said axis and spaced along said axis from the other series of cutters, and the cotters for the cutters of the other series being arranged at more acute angles to said axis and at different distances therefrom than the cutters arranged at the less acute angles to said axis, said cutters and cotters lying in openings in said body, the openings for one series of cotters non-intersecting the openings for the other series of cotters.

8. A tool comprising a body, a pair of series of bar cutters carried by said body, the cutters of each series being arranged in circular array about an axis, the cutters of one series being arranged at more acute angles to said axis than the cutters of the other series, the cutters of one series alternating the cutters of the other series, and a cotter arranged at an angle to each cutter for securing its respective cutter in position, the cotters for the cutters arranged at the more acute angles to said axis being arranged at less acute angles to said axis and spaced along said axis from the other series of cutters, and the cotters for the cutters of the other series being arranged at more acute angles to said axis and at different distances therefrom from the cutters arranged at the less acute angles to said axis, each cutter having a pair of angularly disposed cutting edges, the cutting edges of the several cutters defining two angularly disposed circular perimeters, said cutters and cotters lying in openings in said body, the openings for one series of cotters non-intersecting the openings for the other series of cotters.

FRED P. LOVEJOY.